US009035761B2

(12) United States Patent
Yu

(10) Patent No.: US 9,035,761 B2
(45) Date of Patent: May 19, 2015

(54) CAR KEY AND CAR CONTROL METHOD

(71) Applicant: Chi Mei Communication Systems, Inc., New Taipei (TW)

(72) Inventor: Chun-Chih Yu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/863,413

(22) Filed: Apr. 16, 2013

(65) Prior Publication Data

US 2014/0197941 A1 Jul. 17, 2014

(30) Foreign Application Priority Data

Jan. 17, 2013 (TW) ............................ 101149462 A

(51) Int. Cl.

| | |
|---|---|
| ***B60Q 1/00*** | (2006.01) |
| ***E05B 19/00*** | (2006.01) |
| ***G07C 9/00*** | (2006.01) |

(52) U.S. Cl.
CPC ........ *E05B 19/0088* (2013.01); *G07C 9/00309* (2013.01); *G07C 2009/00261* (2013.01)

(58) Field of Classification Search
CPC .............................. B60R 25/04; B60R 25/245
USPC ................ 340/438, 435, 436, 5.1, 5.64, 5.72, 340/426.36, 692, 901
See application file for complete search history.

(56) References Cited

U.S. PATENT DOCUMENTS

| | | | | |
|---|---|---|---|---|
| 6,624,758 | B1 * | 9/2003 | Omata et al. ............. | 340/426.36 |
| 2004/0027336 | A1 * | 2/2004 | Ishii et al. ..................... | 345/169 |
| 2009/0113961 | A1 * | 5/2009 | Muller ............................ | 70/256 |

* cited by examiner

*Primary Examiner* — Tai T Nguyen
(74) *Attorney, Agent, or Firm* — Novak Druce Connolly Bove + Quigg LLP

(57) ABSTRACT

In a method for controlling a car using a car key, a selected function is received from a function menu displayed on an operation interface of a display device of the car key. System data about the car is acquired from a management unit of the car, and devices of the car are controlled using the management unit, according to the selected function. The system data about the car or status of the devices of the car is displayed on the operation interface of the display device.

9 Claims, 11 Drawing Sheets

CAR KEY AND CAR CONTROL METHOD

BACKGROUND

1. Technical Field

Embodiments of the present disclosure generally relate to automatic control technology, and particularly to a car key and a method for controlling the car using the car key.

2. Description of Related Arts

A car key often includes a remote control device, for locking or unlocking a trunk lid or doors of the car, for example. However, presently, users can only view information (e.g., fuel status) of the car on an instrument panel within the car.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
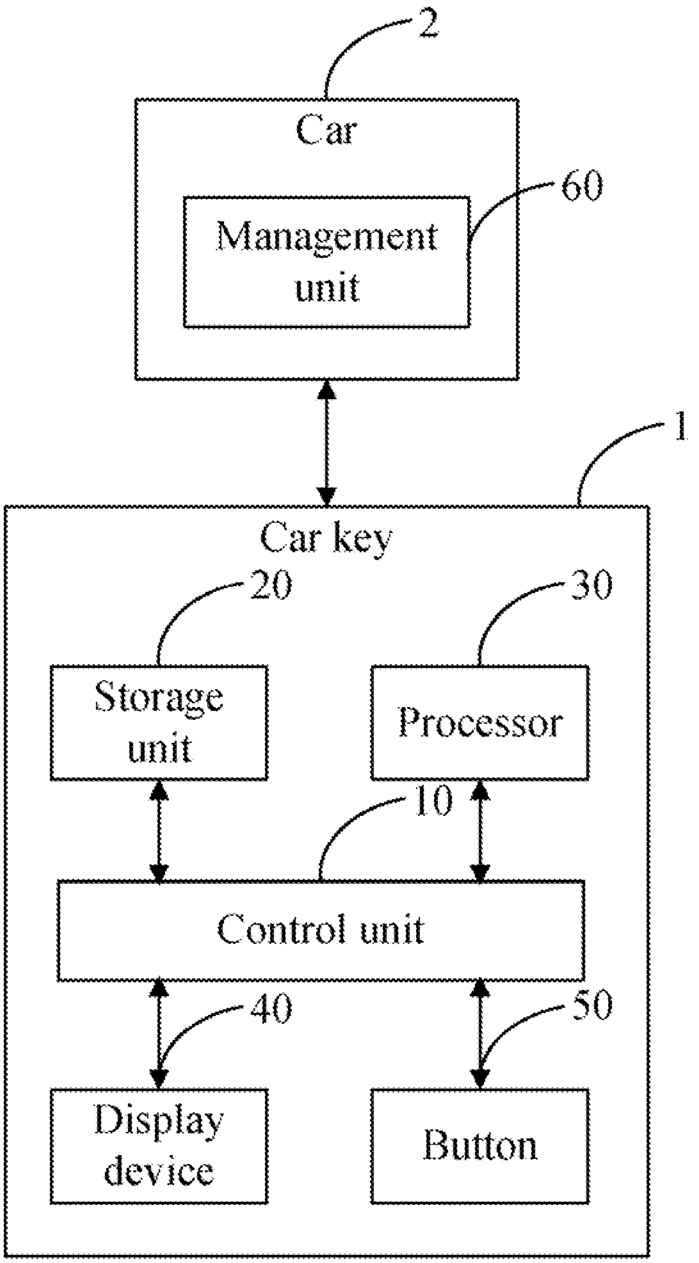
FIG. 1 is a schematic diagram of one embodiment of a car key.

FIG. 1 is a schematic diagram of one embodiment of a car key 1. In the embodiment, the car key 1 includes a control unit 10, a storage unit 20, a processor 30, a display device 40, and one or more buttons 50 (only one is shown in FIG. 1). The car key 1 acquires data (e.g., fuel status) about a car 2 from a management unit 60 of the car 2, and controls devices (e.g., doors or a trunk lid) of the car 2 using the management unit 60.

The display device 40 displays an operation interface, which may show system data about the car 2 to users or be operated on to control the car 2. The one or more buttons 50 are shortcut buttons for locking or unlocking the car key 1, the doors or the trunk lid of the car 2, for example. The management unit 60 manages the system data about the car 2 and status of the devices of the car 2.

Figure 2:
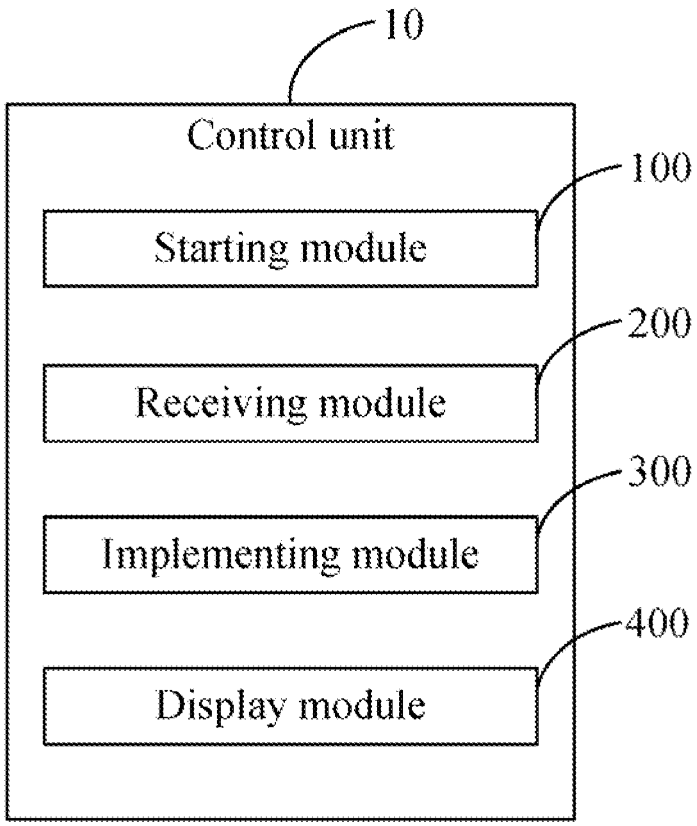
FIG. 2 is a block diagram of one embodiment of function modules of a control unit of the car key in FIG. 1.

In one embodiment, the control unit 10 may include one or more function modules (as shown in FIG. 2). The one or more function modules may comprise computerized code in the form of one or more programs that are stored in the storage unit 20, and executed by the processor 30 to provide the functions of the control unit 10. The storage unit 20 is a dedicated memory, such as an EPROM or a flash memory.

FIG. 2 is a block diagram of one embodiment of the function modules of the control unit 10. In one embodiment, the control unit 10 includes a starting module 100, a receiving module 200, an implementing module 300, and a display module 400. A detailed description of the functions of the modules 100-400 is given with reference to FIG. 3.

Figure 3:
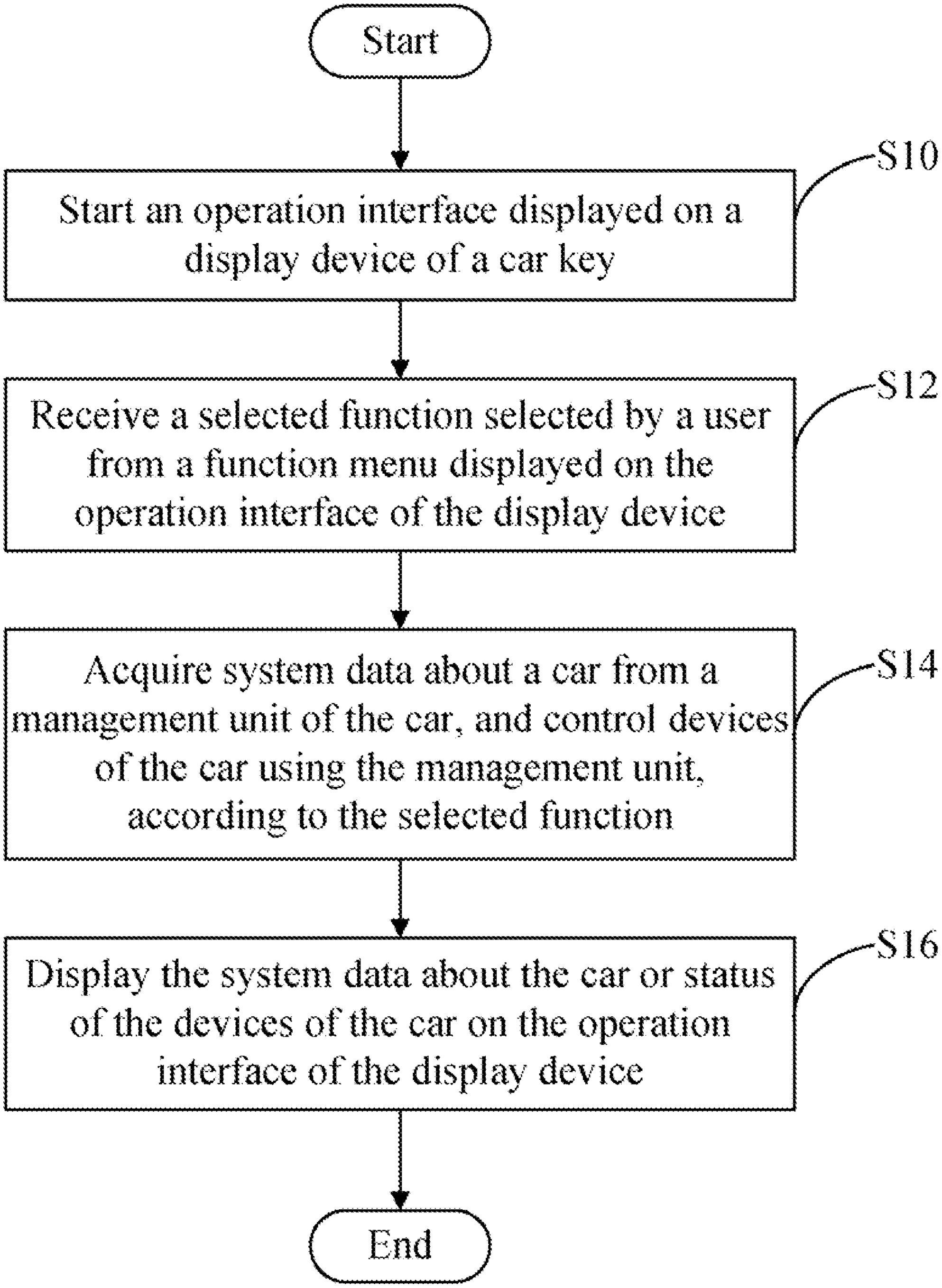
FIG. 3 is a flowchart of one embodiment of a method for controlling a car using the car key in FIG. 1.

FIG. 3 is a flowchart of one embodiment of a method for controlling the car 2 using the car key 1. Depending on the embodiment, additional steps may be added, others removed, and the ordering of the steps may be changed, all steps progress in even numbers only.

In step S10, the starting module 100 starts an operation interface displayed on the display device 40 of the car key 1. In detail, in one embodiment, the starting module 100 runs an opening animation and a loading animation on the display device 40, and displays a function menu. The opening animation (turning on the display device 40) and the loading animation (loading the function menu) may include many continuous pictures in a PNG format. The function menu includes one or more functions of the car key 1, and names and/or icons of the functions are displayed on the operation interface.

In the embodiment, the operation interface displayed on the display device 40 includes three areas: a status area, a display area, and an operation area. The status area displays battery status of the car key 1, and date and time information, for example. The display area displays system data about the car 2 or status (e.g., whether the devices are on/off) of the devices of the car 2. The operation area indicates a page number of the operation interface. Each function of the car key 1 corresponds to one or more pages of the operation interface. Users may press and drag the operation area using a finger to turn the operation interface to a next page of the operation interface.

Figure 4A:
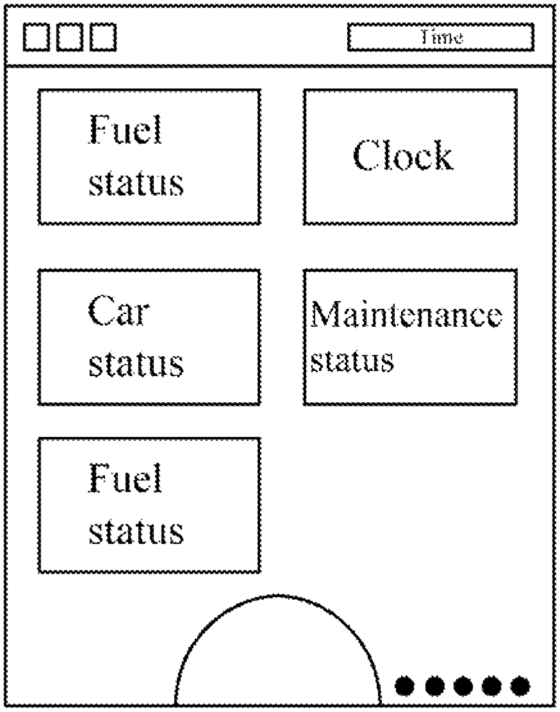
FIG. 4A-4H are schematic diagrams of embodiments of pages of an operation interface displayed on the car key.

FIG. 4A is a schematic diagram of one embodiment of the function menu displayed on the operation interface. In the embodiment, the function menu includes a fuel status function, a clock function, a car status function, a maintenance status function, and a setting function. It is understood that in other embodiments, the function menu may be in a graphical display.

In step S12, the receiving module 200 receives a selected function selected by a user from the function menu displayed on the operation interface of the display device 40. In the embodiment, the user may select the function by clicking a name or an icon of the function displayed on the operation interface.

In step S14, the implementing module 300 acquires the system data about the car 2 from the management unit 60, and controls the devices of the car 2 using the management unit 60, according to the selected function.

For example, if the user selects the fuel status function in the function menu in FIG. 4A, the implementing module 300 transmits a request of system data about the fuel status of the car 2 to the management unit 60, and receives the system data about the fuel status from the management unit 60. If the user selects the car status function in the function menu in FIG. 4A, the implementing module 300 transmits a request of system data about the car status of the car 2 to the management unit 60, and receives the system data about the car status from the management unit 60. If the user further opens a door of the car 2 on a car status function page on the operation interface (as shown in FIG. 4E-4F) by pressing the door of a model on the display device 40, the implementing module 300 transmits a command of unlocking the door to the management unit 60, the management unit 60 receives the command, and controls a lock of the door to unlock the door.

In step S16, the display module 400 displays the system data about the car 2 or the status of the devices of the car 2 on the operation interface of the display device 40.

Figure 4B:
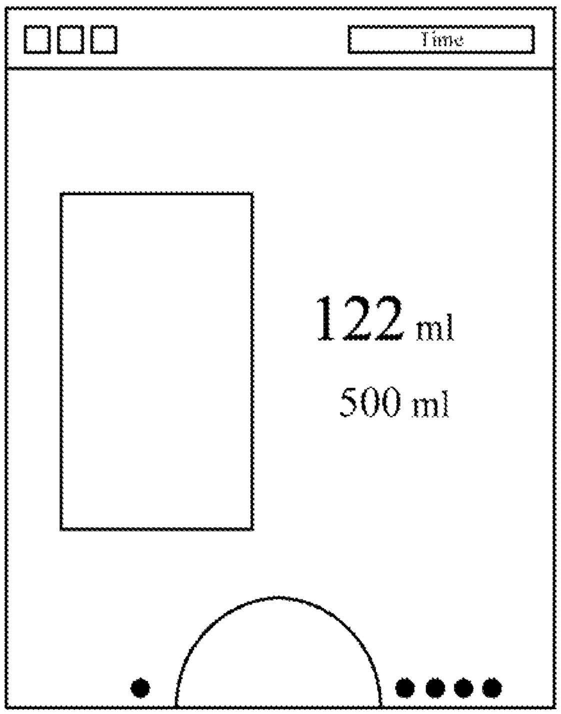

FIG. 4B is a schematic diagram of one embodiment of a fuel status function page of the operation interface. The fuel status is a estimated fuel range, and may be in a numerical or graphical display. If the estimated fuel range is lower than a preset value, the display module 400 displays a warning message (e.g., in red display) to the user.

Figure 4C:
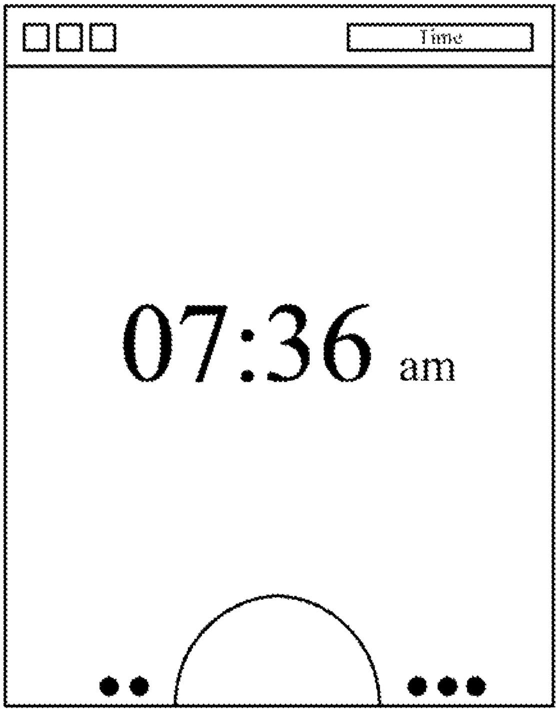
Figure 4D:
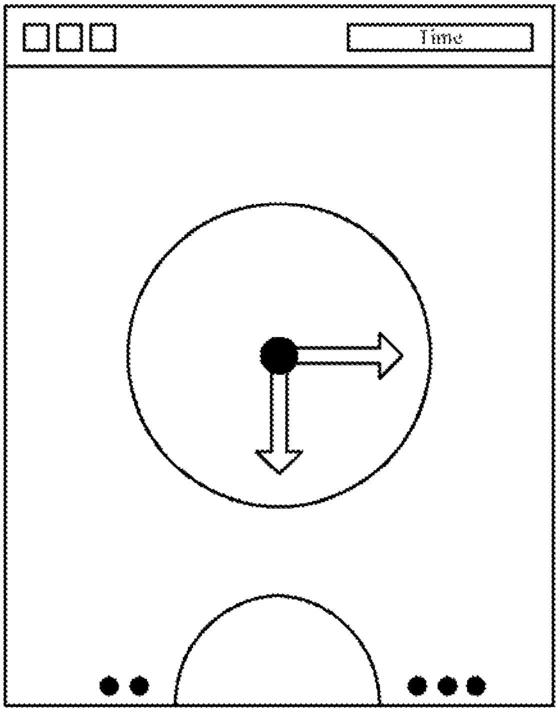
Figure 4E:
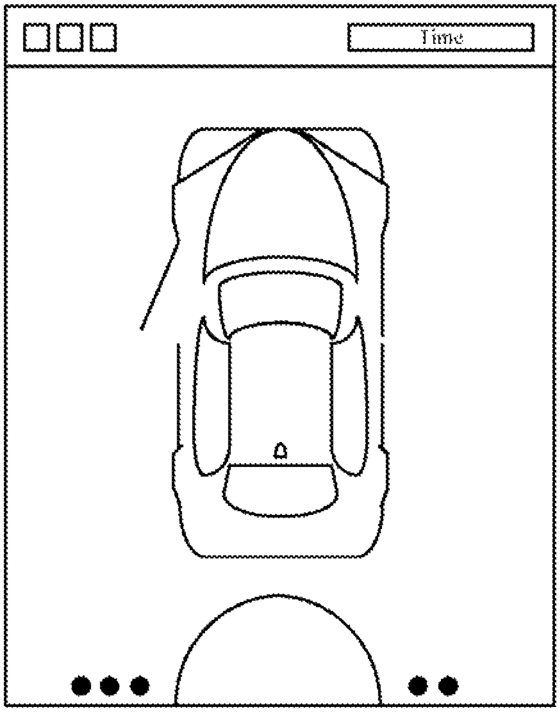
Figure 4F:
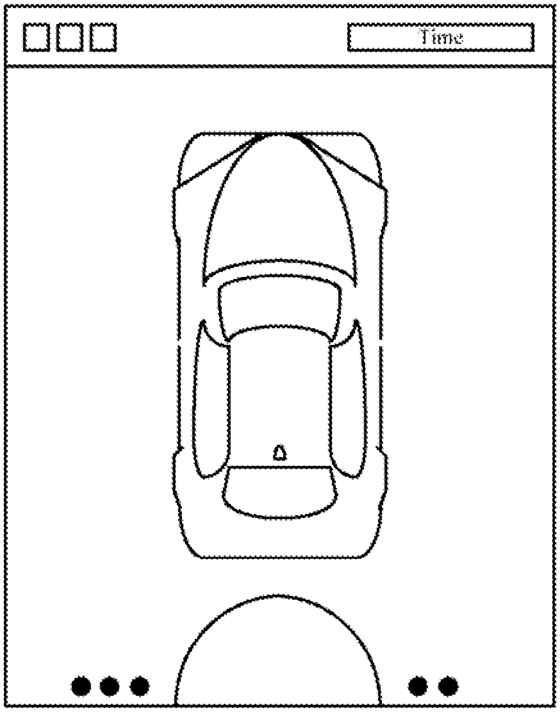

FIG. 4C-4D are schematic diagrams of embodiments of clock function pages of the operation interface. The time may be in a digital display (as shown in FIG. 4C) or in an analog display (as shown in FIG. 4D).

FIG. 4E-4F are schematic diagrams of embodiments of car status function pages of the operation interface. The car status includes a locking or unlocking status of the doors, windows, bonnet, trunk lid, and sunroof of the car 2, for example. The car status is displayed with a model of the car 2. If there is an unusual condition of the car 2 (as shown in FIG. 4E, a driver's door is unlocked), the display module 400 displays a warning message (e.g., the driver's door is in red display and an alarm is sounded) alerting the user. If the unusual condition has been resolved (as shown in FIG. 4F, the driver's door is locked), the warning message is turn off. In the embodiment, the unusual condition of the car 2 includes a unlocking status of the doors, windows, bonnet, trunk lid, and sunroof of the car 2.

Figure 4G:
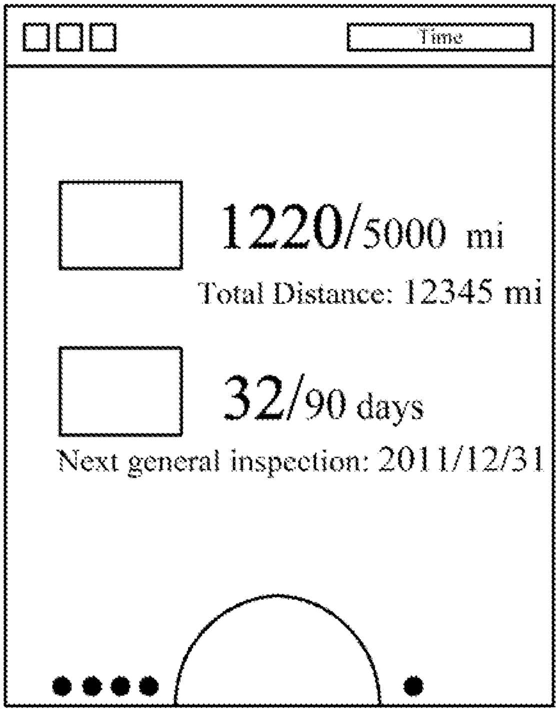

FIG. 4G is a schematic diagram of one embodiment of a maintenance status function page of the operation interface. The maintenance status includes a driven distance from last service, a total distance traveled, days have passed from last service, and an actual date to next service of the car 2, for example.

Figure 4H:
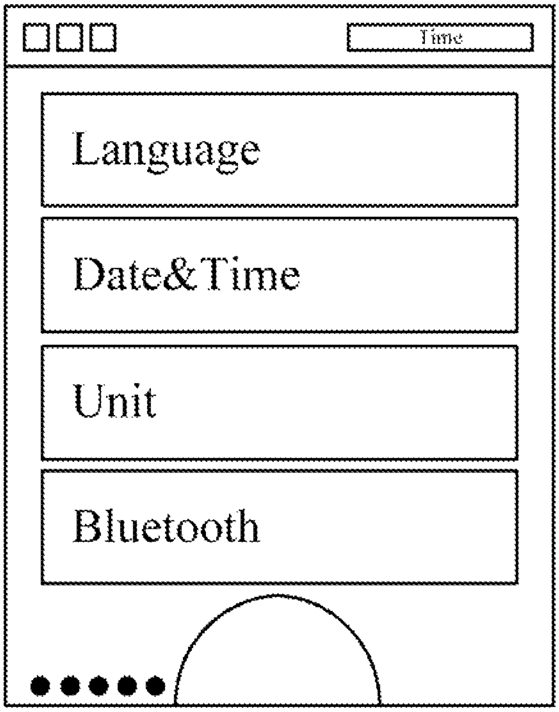

FIG. 4H is a schematic diagram of one embodiment of a setting function page of the operation interface. The setting includes a language setting, a date setting, and a time setting, for example.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method being executed by a processor of a car key, the method comprising:

(a) receiving a selected function from a function menu displayed on an operation interface of a display device of the car key;

(b) acquiring system data of a car from a management unit of the car, and controlling devices of the car using the management unit, according to the selected function; and (c) displaying the system data of the car or status of the devices of the car on the operation interface of the display device;

the operation interface comprising a status area that displays battery status of the car key and date and time information, a display area that displays the system data of the car or the status of the devices of the car, and an operation area that indicates a page number of the operation interface, and the operation area being turned to a next page by pressing and dragging.

2. The method as claimed in claim 1, wherein in step (c), the system data of the car and the status of the devices of the car is in a digital or a graphical display.

3. The method as claimed in claim 1, wherein in step (c), a warning message is displayed on the operation interface in response that there is an unusual condition of the car, and the warning message is turn off in response that the unusual condition has been resolved.

4. A non-transitory storage medium storing a set of instructions, the set of instructions being executed by a processor of a car key, to perform a method comprising:

(a) receiving a selected function from a function menu displayed on an operation interface of a display device of the car key;

(b) acquiring system data of a car from a management unit of the car, and controlling devices of the car using the management unit, according to the selected function; and (c) displaying the system data of the car or status of the devices of the car on the operation interface of the display device;

wherein the operation interface comprises a status area displaying battery status of the car key and date and time information, a display area displaying the system data of the car or the status of the devices of the car, and an operation area indicating a page number of the operation interface, and the operation area being pressed and dragged to turn the operation interface to a next page.

5. The non-transitory storage medium as claimed in claim 4, wherein in step (c), the system data of the car and the status of the devices of the car is in a digital or a graphical display.

6. The non-transitory storage medium as claimed in claim 4, wherein in step (c), a warning message is displayed on the operation interface in response that there is an unusual condition of the car, and the warning message is turn off in response that the unusual condition has been resolved.

7. A car key of a car comprising a management unit, the car key comprising:

a display device;

a storage unit;

at least one processor;

one or more programs that are stored in the storage unit and are executed by the at least one processor, the one or more programs comprising:

a receiving module that receives a selected function from a function menu displayed on an operation interface of the display device;

an implementing module that acquires system data of the car from the management unit, and controls devices of the car using the management unit, according to the selected function; and a display module that displays the system data of the car or status of the devices of the car on the operation interface of the display device;

wherein the operation interface comprises a status area displaying battery status of the car key and date and time information, a display area displaying the system data of the car or the status of the devices of the car, and an operation area indicating a page number of the operation interface, and the operation area being pressed and dragged to turn the operation interface to a next page.

8. The car key as claimed in claim 7, wherein the system data of the car and the status of the devices of the car is in a digital or a graphical display.

9. The car key as claimed in claim 7, wherein the display module further displays a warning message on the operation interface in response that there is an unusual condition of the car, and the warning message is turn off in response that the unusual condition has been resolved.

* * * * *